United States Patent [19]

Broetto

[11] 4,272,755
[45] Jun. 9, 1981

[54] DEVICE FOR INDICATING INSUFFICIENT INFLATION PRESSURE IN VEHICLE TIRES

[75] Inventor: Costantino Broetto, Milan, Italy

[73] Assignee: Fratelli Borletti S.p.A., Milan, Italy

[21] Appl. No.: 63,826

[22] Filed: Aug. 6, 1979

[30] Foreign Application Priority Data

Sep. 1, 1978 [IT] Italy ................................ 69035 A/78

[51] Int. Cl.³ ............................................ B60C 23/02
[52] U.S. Cl. ................................... 340/58; 200/61.25
[58] Field of Search ............. 340/58; 200/61.22, 61.25

[56] References Cited

U.S. PATENT DOCUMENTS

| 3,665,387 | 5/1972 | Enabnit | 340/58 |
| 3,858,174 | 12/1974 | Harris | 340/58 |
| 4,057,783 | 11/1977 | Blanchier | 340/58 |

Primary Examiner—Alvin H. Waring
Attorney, Agent, or Firm—Merriam, Marshall & Bicknell

[57] ABSTRACT

A device for indicating insufficient inflation pressure in vehicle tires and of the type comprising an emitter coil (6,7,8,9) and a receiver coil (16,17,18,19) housed on a fixed support of said vehicle so that they can coupled only by a first and second transfer coil (not illustrated) disposed in any wheel and connected in series with an electric contact operated by a transducer when the value of the pressure in said tire exceeds a minimum set value is described.

The main feature of said device is that it comprises memory means (47,75) and control means (57,58) connected with an output of memory means; and alarm means (76,77) connected with an output of said memory means; said control means being arranged to automatically activate said memory means so that they receive the signal received periodically by the receiver coil, only when said signal has a frequency exceeding a minimum set value.

31 Claims, 1 Drawing Figure

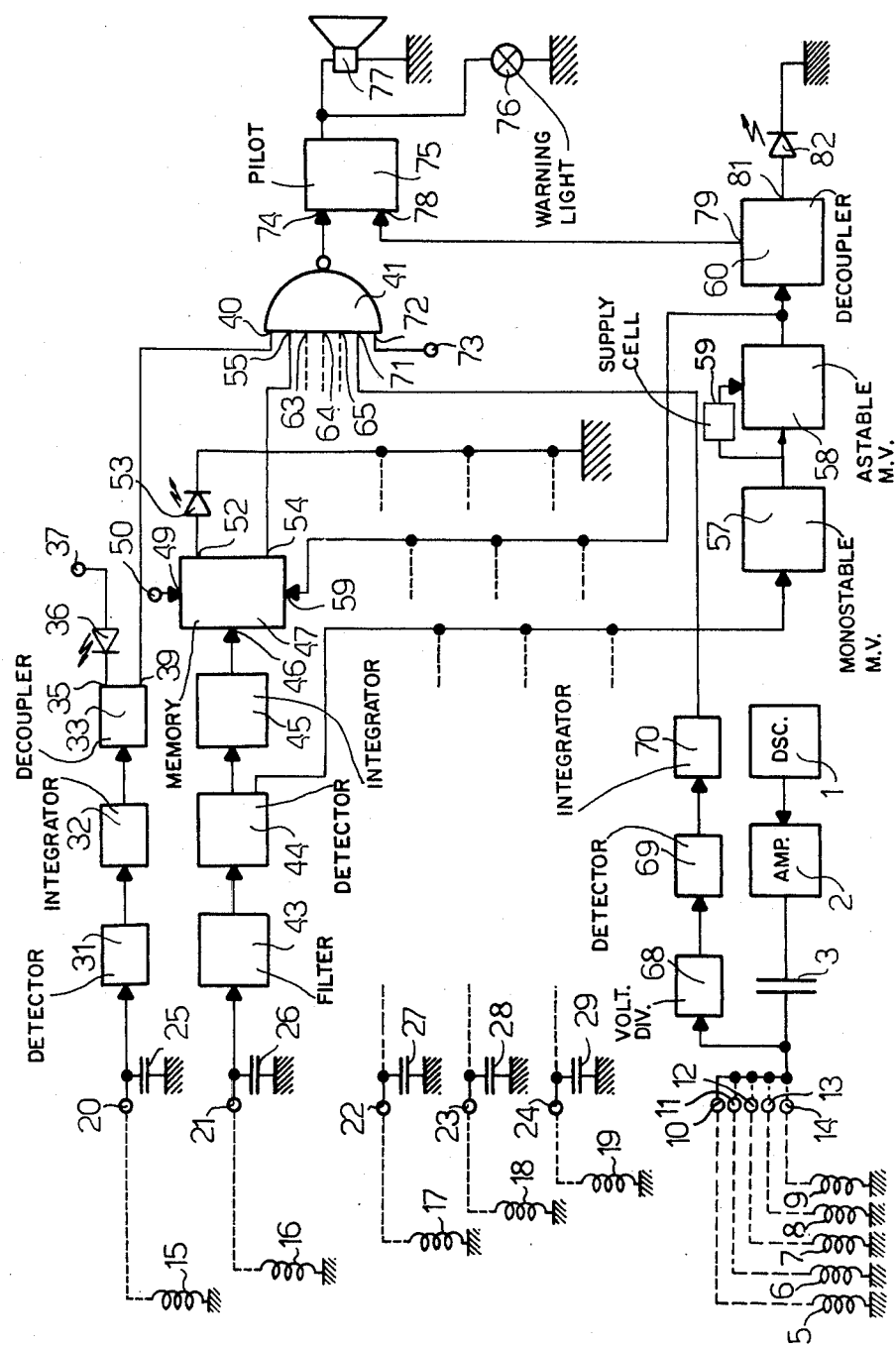

DEVICE FOR INDICATING INSUFFICIENT INFLATION PRESSURE IN VEHICLE TIRES

BACKGROUND OF THE INVENTION

This invention relates to a device for indicating insufficient inflation pressure in vehicle tyres.

Known devices comprise substantially a transducer housed in a wheel of the vehicle, and arranged to open or close an electrical contact if the tyre pressure falls below a set minimum value. The state (open or closed) of the electrical contact, and consequently the state of the tyre pressure, is transmitted electromagnetically or by inductive coupling, to a processing circuit disposed on the vehicle body and arranged to indicate insufficient pressure by means of optical and/or acoustic indicators.

The devices which transmit this state electromagnetically require the use of a transmitter circuit (for example an oscillator) mounted on each wheel and supplied by an associated battery. These have the advantage of allowing indication under any wheel condition (whether at rest or rotating), but have a serious drawback related to the supply battery, which requires frequent checking of its state of charge, and puts the wheel out of balance. As a transmitter circuit with its own battery is required for each wheel, the total cost of a device of this type is fairly high. Finally, because of the type of transmission system used, these devices can cause electromagnetic disturbances, and can be influenced by electromagnetic fields external to the vehicle.

Devices which transmit the state of the electrical contact by inductive coupling comprise substantially a first and a second transfer coil housed in the wheel and connected electrically together so as to have a first terminal in common, with their second terminal being connected together via the electrical contact operated by said transducer. In proximity to each wheel, the vehicle body also houses an emitter coil connected to the output of a transmitter circuit, and a receiver coil connected to the input of a processing circuit and arranged to be coupled to the emitter coil only through said transfer coils, when said electrical contact is closed. An electrical signal therefore reaches each processing circuit from the transmitter circuit, and generally is of the periodic pulse type as it is received for each revolution of the wheel when the emitter and receiver coils are facing the first and second transfer coil respectively.

The tyre pressure can therefore only be checked when the vehicle is moving. This check is generally made by comparing the signals received from the various receiver coils with those provided by a receiver coil mounted on a reference wheel, and the lack of any signal from a wheel compared with the reference wheel gives rise to immediate indication of insufficient pressure.

The lack of a signal can however occur for reasons independent of the tyre pressure. For example, it can be due to recoiling of the transducer electrical contact caused by a particularly rough road, or can be due to a narrow bend travelled by the vehicle, in which the inner wheels travel through a smaller space than the outer wheels and therefore emit a smaller number of electrical signals than these latter.

Finally, when the vehicle is at rest, for example at traffic lights, there is generally a complete lack of signals from the receiver coils, with a consequent immediate indication of insufficient pressure in all the vehicle wheels.

SUMMARY OF THE INVENTION

The object of the present invention is to provide a device for indicating insufficient pressure in vehicle tyres, which is substantially free from the drawbacks of known devices as heretofore specified.

The present invention provides a device for indicating insufficient inflation pressure in vehicle tyres, of the type comprising an emitter coil supplied by a signal generator at a determined frequency, and a receiver coil, said emitter and receiver coils being housed on a fixed support of said vehicle in proximity to each rotating wheel so that they cannot be inductively coupled together but can be coupled together only by a respective coupling circuit disposed on each wheel, said circuit comprising a first and a second transfer coil connected in series with an electrical contact operated by a transducer sensitive to the values of said pressure in said tyre; said transfer coils being disposed in said wheel in such a manner as to allow said receiver coil to periodically receive a signal supplied by said generator to said emitter coil when the transfer coils respectively face said emitter coil and said receiver coil and if said electrical contact has closed said coupling circuit due to said pressure exceeding a minimum set value, wherein said signal periodically received by each of said receiver coils is fed to relative memory means and control means; said control means being arranged to automatically activate said memory means so that they receive said signal only when said vehicle has a speed exceeding a set minimum speed, and consequently said signal received periodically by said receiver coil has a repetition frequency exceeding a minimum set value; the output signal from said memory means being arranged to activate alarm means if there is no reception of said signal from at least one of said receiver coils due to a reduction in inflation pressure below said minimum set value.

BRIEF DESCRIPTION OF THE DRAWINGS

The present invention will be more apparent from the description of a preferred embodiment given hereinafter by way of non-limiting example with reference to the accompanying drawing, which shows its circuit diagram.

DETAILED DESCRIPTION OF THE INVENTION

With reference to said diagram, an oscillator 1, for example of sinusoidal type and having an inherent frequency of a few KHz, supplies, by way of an amplifier 2 and a capacitor 3 connected in series, a plurality of coils 5, 6, 7, 8 and 9, each having a first terminal connected to earth and a second terminal connected to the capacitor 3 by means of respective connection terminals 10, 11, 12, 13 and 14. Each of these coils is disposed on a fixed support in proximity to a corresponding vehicle wheel, and will be known hereinafter as an emitter coil. In particular, the coil 5 is mounted in a seat in the spare wheel of said vehicle, whereas the emitter coils 6, 7, 8 and 9 are disposed in proximity to four wheels on which the vehicle runs.

A second plurality of receiver coils 15, 16, 17, 18 and 19 have a first terminal connected to earth and a second terminal connected respectively to connection terminals 20, 21, 22, 23 and 24. As in the case of the emitter coils, each receiver coil is mounted on said fixed support in proximity to the respective vehicle wheel, in such a manner that it cannot become inductively coupled to the corresponding emitter coil. The coil 15 and coil 5 are disposed in the seat in the spare wheel, whereas the coils 16, 17, 18 and 19 are correspondingly housed on the fixed supports which already house the emitter coils 6, 7, 8 and 9.

In a manner not illustrated, each wheel supports a first and second transfer coil connected together at one end and arranged to be inductively coupled to the corresponding emitter and receiver coils. In this respect, the relative position of all the coils associated with each wheel is such that when the first transfer coil is coupled to the emitter coil, the second transfer coil is coupled to the receiver coil. The other ends of the transfer coils are connected to the ends of an electrical contact, the operation of which is controlled by a transducer sensitive to the tyre inflation pressure, in such a manner that the contact is normally closed when the inflation pressure exceeds a set minimum value.

The transfer coils and said contact therefore form a series circuit in which a capacitor can be connected in series in order to improve efficiency at a particular frequency, preferably the frequency of the signal supplied by the oscillator 1, by forming with said transfer coils a parallel resonant circuit.

Each connection terminal 20, 21, 22, 23 and 24 is connected to earth via a respective capacitor 25, 26, 27, 28 and 29, each of which with its coil 15, 16, 17, 18 and 19 forms a parallel resonant circuit tuned preferably to the frequency of the signal supplied by the oscillator 1.

The terminal 20 is also connected, via a series-connected detector 31 and integrator 32, preferably in the form of an RC unit, to the input of a decoupling and control circuit 33. One output 35 of the circuit 33 is connected to the cathode of a light emitting diode 36, the anode of which is connected via a terminal 37 to the positive pole of a direct current supply source, and the other output 39 of the circuit 33 is connected to an input 40 of an NAND logic gate 41.

The signal from the receiver coil 16 passes through the terminal 31 to the input of an active band pass filter 43, the output of which is connected to the input of a detector 44. A first output of the detector 44, at which there is a positive signal of amplitude proportional to the envelope of the signal present at the terminal 21, is connected via an integrator 45 to the signal input 46 of a logic memory 47, preferably a bistable multivibrator, for example of type D. The memory 47 comprises a zeroing input 49 connected to a terminal 50, which is connected in a manner not illustrated to a RC unit which allows automatic zeroing of the memory 47 each time the device concerned is supplied. This memory also comprises a negated output 52 which is connected to earth through a light emitting diode 53, and a non-negated output 54 which is connected to the input 55 of the NAND gate 41.

A second output of the detector 44, at which a pulse signal is present each time an electrical signal is received by the receiver coil 16, is connected to the input of a monostable circuit 57 forming pulses of set amplitude and duration. The output of the monostable circuit 57 is connected to the input of an astable circuit 58. The astable circuit 58 comprises a supply cell 59, for example of RC type, which supplies it with a sufficient supply voltage only if the frequency of the pulses received from the output of the monostable circuit 57 is such that the average value of the energy stored in the capacitor of the RC cell exceeds a minimum set value. The output of the astable circuit 58 is connected to a clock input 59 of the memory 47 and to the input of a decoupling and control circuit 60.

The capacitor 26, the active filter 43, the detector 44, the integrator 45, the logic memory 47 and the light emitting diode 53 constitute in total a processing chain for the signal supplied by the receiver coil 16. In a like manner, the signals received from the coils 17, 18 and 19 reach processing chains equal to the said chain, and the non-negated outputs of the corresponding logic memories are connected to inputs 63, 64 and 65 of the NAND gate 41. In addition, the second output of the respective detector (corresponding to the detector 44) is connected to the input of the monostable circuit 57, and respective zeroing inputs of the various logic memories are connected together and then to the terminal 50, whereas clock inputs of these memories are connected together and to the output of the astable circuit 58.

The electrical signal supplied by the oscillator 1 and amplified by the amplifier 2 is received downstream of the capacitor 3 and fed through a voltage divider 68, a detector 69 and an integrator 70 connected in series, to an input 71 of the NAND gate 41. This latter comprises a further input 72 connected to a terminal 73, and has its output connected to an input 74 of a pilot stage 75, the output of which is connected to earth both through a warning light 76 and through a warning horn 77. The activation input 78 of the stage 75 receives a signal from an output 79 of the circuit 60, the other output 81 of which is connected to earth through a light emitting diode 82.

The operation of the device according to the present invention is described hereinafter, with some data being firstly given relative to the operation and rest conditions of certain components.

As soon as the device is supplied, there is immediate zeroing of the logic memory 47 through the RC network connected to the terminal 50, following which the output 54 is brought to logic level "1" and the output 52 is brought to logic level "0" in the case of the memory 47 and the analogous memories, not shown. These logic memories accept a logic signal present at their signal input 46 only when there is a logic level transition of the signal present at the respective clock input 59. In addition, the integrator 45 (for example of the type comprising an RC cell) has been designed so as to present a very reduced charge time constant, and a discharge time constant much higher than the latter. In this manner, the signal received from the first output of the detector 44, and corresponding for example to a logic level "1", is almost instantaneously stored by the integrator 45, whereas the time required for the output of the integrator 45 to return to logic level "0" is much higher, for example of the order of some seconds. The monostable multivibrator 57 is activated to supply its set output pulse only on input signal transitions from level "1" to level "0".

The astable multivibrator 58 normally has its output at logic level "1", and in order to be able to begin operating it has to receive a minimum number of pulses (for example seven) from the monostable multivibrator 57, and these have to be contained within a relatively short set period of time. As stated, in order to maintain generation of its output signal, the astable multivibrator 58 has to receive at its input a series of pulses from the output of the monostable circuit 57 having a frequency exceeding a minimum set value.

Finally, in the device according to the invention, the terminal 73 is connected to the positive pole of a direct current supply voltage, so that a signal at logic level "1" is present at the input 72 of the NAND gate 41.

It will now be assumed that initially the vehicle concerned is at rest, and all the wheels are inflated to a pressure exceeding a minimum set value. It will also be assumed that the spare wheel is housed in its compartment so that the first and second transfer coil supported by it face the emitter coil 5 and the receiver coil 15 respectively, whereas in the case of the other wheels, no pair of transfer coils faces the respective emitter and receiver coil pair.

Under these conditions, the signal supplied by the oscillator 1 passes through the amplifier 2 and capacitor 3, to the emitter coils 5, 6, 7, 8 and 9 and to the input of the voltage divider 68 respectively. As stated, only the receiver coil 15 of the spare wheel receives the signal from the emitter coil 5. This signal is fed through the detector 31 and integrator 32 to the circuit 33, the outputs 35 and 39 of which are brought to logic level "1". Consequently, the light emitting diode 36 is extinguished, and the input 40 of the NAND gate 41 is maintained at logic level "1".

No signal is received by the other receiver coils (16, 17, 18 and 19), and consequently no signal is fed from the respective detector 44 to the monostable multivibrator 57 or to the memory 47 through the integrator 45. Consequently, the input 46 of this memory and of analogous memories are at logic level "0", whereas as the monostable multivibrator 57 has not received any activation signal, it supplies no activation signal to the astable multivibrator 58, the output of which is therefore kept at logic level "1". The various logic memories cannot therefore be updated, and maintain their outputs at the preset zero setting levels. The light emitting diode 53 and the analogous light emitting diodes, not shown, are consequently extinguished, and the inputs 55, 63, 64 and 65 of the NAND gate 41 are at logic level "1".

The output of the astable multivibrator 58, at level "1", is also connected to the input of the circuit 60, the outputs 79 and 81 of which are maintained at logic level "1". The output 81 activates the light emitting diode 82, whereas the output 79 feeds an activation signal to the input 78 of the pilot stage 75.

If the correct voltage level is present at the input of the voltage divider 68, this is detected by way of the divider 68, the detector 69 and integrator 70, so as to provide a logic signal at level "1" at the input 71 of the NAND gate 41.

In conclusion, all the inputs of the NAND gate 41 are at logic level "1", and therefore the output of this gate is at logic level "0". Consequently, even if an activation signal is present at the input 78 of the pilot stage 75, the output of this stage is maintained at logic level "0", as the input 74 is at level "0", and therefore the warning light 76 or warning horn 77 are not activated.

If, when the vehicle is at rest, one or more receiver coils (for example coil 16) permanently receive an electrical signal because they are facing the corresponding transfer coil disposed on the wheel, the detector 44 feeds a permanent logic signal at level "1" to the input 46 of the logic memory 47, and a logic signal at level "1" to the input of the monostable multivibrator 57. Such conditions do not change the operation of the device, because the memory 47 continues to maintain the outputs at the said logic levels, whereas as the monostable multivibrator 57 can be activated only by transition of its own input signal from logic level "1" to logic level "0", it feeds no pulse to the input of the astable multivibrator 59.

It will now be assumed that the vehicle is moving at a speed less than a predetermined limiting value (for example 5–10 km per hour), and that the wheels are still all correctly inflated.

No change is introduced to the operation by the spare wheel, which by way of the receiver coil 15 maintains the input 40 of the NAND gate 41 at logic level "1", the inputs 71 and 72 of this gate still being assumed to be at level "1".

As the vehicle wheels are moving, the receiver coils 16, 17, 18 and 19 become coupled with the corresponding emitter coils 6, 7, 8 and 9, for each revolution of the wheel, by way of the corresponding transfer coils mounted on each wheel, and there is consequently a periodical electrical signal at each of the terminals 21, 22, 23 and 24.

In the case of coil 16, the signal present at terminal 21 is amplified and filtered in the filter 42, detected in the detector 44, and fed from this latter through the integrator 45 to the input 46 of the logic memory 47 at logic level "1", and to the input of the monostable multivibrator 57 in the form of a pulse for each wheel revolution. There is thus periodically present at the input of the monostable multivibrator 57 a series of four pulses for each complete revolution of the wheels, but as the vehicle speed is less than the said limiting value, these pulses are spaced too far apart to enable the monostable multivibrator 57 to activate the astable multivibrator 58. The output of this latter is therefore maintained at logic level "1", and does not allow updating of the said logic memories, the device therefore operating downstream of said memories and downstream of the astable multivibrator 58 in a manner analogous to that described with the vehicle at rest.

If the vehicle speed exceeds the said minimum value, the pulses supplied by the monostable multivibrator 57 have a frequency sufficient to stably activate the astable multivibrator 58, the output of which therefore oscillates alternately between logic levels "1" and "0". During the transitions from logic level "1" to logic level "0", this output signal causes the said logic memories to receive, so that they are able to transfer the information present at the respective signal input to the relative outputs.

If the device operates correctly, and if the pressure in said tyres is at the correct level, the inputs of said memories are maintained at logic level "1" by the upstream integrators. Consequently, as heretofore described, all the inputs of the NAND gate 41 are at logic level "1", and the relative output is at logic level "0". There is therefore no signal from the warning light 76 or warning horn 77, and the light emitting diode 82, via the circuit 60, is alternately activated and deactivated by the output signal from the astable multivibrator 58. The intermittent operation of the light emitting diode 82 therefore indicates both that said minimum vehicle speed is exceeded and that the control operations on the signals received by the detector coils 16, 17, 18 and 19 are properly carried out.

It will now be assumed that with the vehicle running above the said minimum speed, a reduction takes place in the pressure in one of the tyres, for example the tyre relative to the emitter coil 6 and receiver coil 16.

The contact associated with the pressure transducer in this tyre is therefore opened and consequently the series circuit constituted by said transfer coils is broken, it being consequently impossible to transfer the signal provided by the emitter coil 6 to the receiver coil 16. At the output of the active filter 43 there is therefore no signal, and there is also no signal at the first and second outputs of the detector 44. After the said set period of time, which is of the order of some seconds, the output signal provided by the integrator 45 changes to logic level "0". Because of the high vehicle speed, the astable multivibrator 58 is regularly supplied with output signals from the monostable multivibrator 57, even though one of the four input signals to this latter is missing, namely that received from the second output of the detector 44.

When the clock signal supplied by the astable multivibrator 58 changes from logic "1" to logic level "0" after the output signal of the integrator 45 has reached level "0", there is an immediate transfer of this output signal at logic level "0" to the logic memory 47. Consequently the output 54 of the memory 47 passes to logic level "0" and the output 52 passes to logic level "1", this latter activating the light emitting diode 53. In addition, the signal at logic level "0" present at the output 54 is transferred to the input 55 of the NAND gate 41, the output of which correspondingly passes to logic level "1" and thus, by way of the pilot stage 75, activates the warning light 76 and warning horn 77. In this respect, the lighting of the warning light 76 and the sound produced by the warning horn are modulated by the signal present at the activation input 78 of the stage 75 and originating from the circuit 60, on the basis of which an intermittent operation of the warning devices 76 and 77 is obtained, at the same frequency as the output signal from the astable multivibrator 58.

The particular tyre associated with the coils 6 and 16, and in which the inflation pressure is less than the minimum value, is therefore easily determined by observing which light emitting diode 53 is lit.

The device behaves in a substantially analogous manner when the pressure in the spare wheel falls below a minimum value.

Under such conditions, the receiver coil 15 is no longer coupled to the emitter coil 5, and therefore there is no signal at the terminal 20. The input of the circuit 33 therefore passes to logic level "0" by way of the detector 31 and integrator 32, and the outputs 35 and 39 of this circuit also pass to logic level "0" to activate the light emitting diode 36 and pilot stage 75 respectively, by way of the logic NAND gate 41 as heretofore described.

This device also indicates any abnormalities not due to reductions in tyre pressure but deriving from the device itself.

For example, any breakage in the supply cables to the emitter, receiver or transfer coils is sensed by the device as a lack of signal to one of the inputs 20, 21, 22, 23 and 24, and is therefore indicated by activating the relative light emitting diode (36, 53 etc.) and the warning light 76 and warning horn 77. Because there is no pressure reduction in any of the tyres in this case, the signal given by any of the light emitting diodes 36, 53 etc. indicates either one of said breakages or the ineffectiveness of one of the components (active filter, detector, integrator, logic memory) which constitute the respective processing chain.

If there is a too high voltage drop between the capacitor 3 and the emitter coils due to one of said components or to the amplifier 2 or oscillator 1, this is immediately shown up by the chain formed by the voltage divider 68, detector 69 and integrator 70. In this case, the signal received by the voltage divider 68 is not sufficient to control the detector 69 and integrator 70, the output of which feeds a signal at logic level "0" to the input 71 of the NAND gate 41. The warning light 76 and warning horn 77 are consequently activated by way of the pilot stage 75, without any fault indication by the light emitting diodes relative to the wheels occurring. This therefore indicates that there is an internal fault in the device relative to the oscillator 1, amplifier 2, capacitor 3 or the chain comprising the voltage divider 68, integrator 69 and detector 70.

Any internal fault in the device dependent on the monostable multivibrator 57, astable multivibrator 58 or circuit 60 is indicated by means of the light emitting diode 82, which will either be always alight or always extinguished even after the vehicle has exceeded said minimum speed.

Finally, it is possible to extend the application of the device to vehicles comprising more than four mobile wheels plus one spare wheel, by utilising the terminal 73 which could be connected to the output of a further processing chain analogous to those described, and associated with a further wheel or with a series of other wheels, in this latter case interposing a suitable logic gate.

From an examination of the characteristics of the present invention, it is apparent that the device attains the said objects.

Firstly, the state of motion of the vehicle is automatically recognised, so that when the vehicle stops, for example at a traffic light, the device is automatically cut out, and therefore any false alarm is avoided. In addition, as the signals present at the inputs 21, 22, 23 and 24 are not counted, but instead only subjected to a check on their presence or absence, the drawbacks of known devices are avoided when the vehicle travels through a narrow bend.

By using integrators in the processing chain for the signal provided by the receiver coils, any lack of reception of a pulse, due for example to a false contact or recoiling of the electrical contact associated with the pressure transducer on account of vibration due to a rough road, does not give rise to an immediate fault indication. In this respect, the discharge time for each integrator is sufficiently long to maintain the input of the relative logic memory at level "1", even if several consecutive pulses are lost. In all cases, the subsequent recharging of the integrator is rapid and substantially instantaneous, even with a single input pulse.

As heretofore described, the device according to the invention also indicates the presence of any fault in the device itself, and its location is facilitated by the said light emitting diodes.

Further circuit advantages can be seen from the accompanying diagram. For example, the use of a band pass active filter in the said processing chains both eliminates electrical disturbance signals which could be received by the receiver coils, and also gives amplification of the signal reaching these latter from the emitter coils by way of the transfer coils. These active filters can be sized so as to have a high input impedance which only slightly loads the parallel oscillating circuit constituted by each detector coil and its capacitor, and at the same time to have an output impedance of a suitable value for piloting the detector stage disposed downstream of the filter.

Furthermore, there is no disturbance at radio frequencies because of the emission frequency (a few KHz) and the wave form (sinusoidal) of the signal in the emitter coils.

The modulation of the alarm signal provided by the warning light 76 and warning horn 77 means that these latter can be noticed even under considerably disturbed conditions in the vehicle driving cab.

Finally, if the vehicle is bogged down and has some wheels moving and others at rest, it is possible to determine which of the wheels is at rest by means of the light emitting diodes associated with the respective wheels.

Finally, it is apparent that modifications can be made to the present invention which do not leave the scope of the inventive idea.

What I claim is:

1. A device for indicating insufficient inflation pressure in vehicle tires, comprising an emitter coil supplied by a signal generator at a determined frequency, and a receiver coil, said emitter and receiver coils being housed on a fixed support of said vehicle in proximity to each rotating wheel so that they cannot be inductively coupled together but can be coupled together only by a respective coupling circuit disposed on each wheel, said coupling circuit comprising a first and a second transfer coil connected in series with an electrical contact operated by a transducer sensitive to the values of said pressure in said tire; said transfer coils being disposed in said wheel in such a manner as to allow said receiver coil to periodicically receive a signal supplied by said generator to said emitter coil when the transfer coils respectively face said emitter coil and said receiver coil and if said electrical contact has closed said coupling circuit due to said pressure exceeding a minimum set value; said signal periodically received by each of said receiver coils being fed to relative memory means and control means adapted to automatically activate said memory means so that they receive said signal only when said vehicle has a speed exceeding a set minimum speed, and consequently said signal received periodically by said receiver coil has a repetition frequency exceeding a minimum set value; said control means comprising a supply cell and an astable multivibrator controlled by said supply cell, said multivibrator when activated producing an output signal which actuates said memory units, said supply cell activating said mutivibrator only when said cell receives said signal at a frequency exceeding said minimum set value, whereby the average energy of the signal exceeds a predetermined value; the output signal from said memory means being arranged to activate alarm means if there is no reception of said signal from at least one of said receiver coils due to a reduction in inflation pressure below said minimum set value.

2. A device as claimed in claim 1, wherein said supply cell receives a pulse signal having a set amplitude and duration, and coinciding with the reception of said signal by said receiver coils.

3. A device as claimed in claim 2, wherein said pulse signal is generated by a monostable multivibrator.

4. A device as claimed in claim 1, wherein said signal periodically received by each of said receiver coils is fed to said memory means and to said control means by way of a processing network comprising a band pass filter.

5. A device as claimed in claim 4, wherein said filter is of active type.

6. A device as claimed in claim 4, wherein said processing network comprises a detector circuit connected to the output of said filter and arranged to detect said signal periodically received by each of said receiver coils.

7. A device as claimed in claim 6, wherein said detector circuit has a first output at which a pulse signal is present to coincide with each signal reception by said receiver coil, said pulse signal of said first output being fed to the input of said monostable multivibrator.

8. A device as claimed in claim 6, wherein said detector circuit has a second output at which a signal is present proportional to the envelope of said signal received by said receiver coil, said signal of said second output being fed to the input of said memory means by way of an integrator circuit.

9. A device as claimed in claim 8, wherein the ratio between the charge time constant and the discharge time constant of said integrator circuit is much less than 1.

10. A device as claimed in claim 8, wherein said integrator circuit is of RC type.

11. A device as claimed in claim 1, wherein said memory means comprise a plurality of bistable multivibrators each associated with a corresponding receiver coil.

12. A device as claimed in claim 11, wherein each of said bistable multivibrators is of D type.

13. A device as claimed in claim 1, wherein it comprises a zeroing network which automatically zeroes the contents of said memory means when said device is activated into its operating state by an external control signal.

14. A device as claimed in claim 13, wherein said zeroing network is of RC type.

15. A device as claimed in claim 1, wherein each of said memory means comprises a relative output at which, when said signal is not received by said receiver coil for a set period of time and with the vehicle running at a speed exceeding said minimum speed, an electrical signal is present arranged to activate said alarm means.

16. A device as claimed in claim 15, wherein each of said outputs of said memory means is connected to said alarm means by way of an adding network.

17. A device as claimed in claim 1, wherein it comprises an emitter coil and a receiver coil housed on a fixed support of said vehicle in proximity to the spare wheel, said receiver coil constantly receiving a signal from said emitter coil by way of said transfer coils disposed in said spare wheel, when its inflation pressure exceeds said minimum set value; any reduction in the pressure in said spare wheel below said minimum value leading to lack of reception of said signal at said receiver coil, with consequent activation of said alarm means by means of a corresponding processing network.

18. A device as claimed in claim 17, wherein each of said outputs of said memory means is connected to said alarm means by way of an adding network.

19. A device as claimed in claim 18, wherein said processing network for said spare wheel comprises a detector circuit connected in series with an integrator circuit; the output signal from said integrator circuit being fed substantially to the input of said adding network.

20. A device as claimed in claim 1, wherein it comprises a control circuit which constantly determines the output voltage values of the signal fed by said signal generator to each of said emitter coils; any reduction in said voltage value to below a minimum set level giving rise in said control circuit to an output signal arranged to activate said alarm means.

21. A device as claimed in claim 20, wherein said control circuit comprises a detector circuit connected in series with an integrator circuit, the output signal from said integrator circuit being fed to the input of said processing network.

22. A device as claimed in claim 1, wherein said emitter coils are connected in parallel.

23. A device as claimed in claim 22, wherein a capacitor is connected between said signal generator and said emitter coils, and is of such a value as to constitute together with said emitter coils a series resonance circuit having an inherent resonance frequency substantially equal to said frequency of the signal supplied by said generator.

24. A device as claimed in claim 23, wherein said control circuit takes said signal supplied by said generator at a junction point between said capacitor and said emitter coils.

25. A device as claimed in claim 1, wherein a capacitor is connected in parallel with each of said detector coils, and is of such a value as to constitute together with said receiver coil a parallel resonance circuit having an inherent resonance frequency substantially equal to said frequency of the signal supplied by said generator.

26. A device as claimed in claim 1, wherein said generator generates a sinusoidal signal.

27. A device as claimed in claim 1, wherein a respective warning element is associated with each of said memory means in order to allow the location of any pressure reduction in any of said wheels to be determined.

28. A device as claimed in claim 1, wherein said alarm means are arranged to be activated and deactivated periodically in order to generate an intermittent signal.

29. A device as claimed in claim 28, wherein said alarm means are activated and deactivated by said output signal supplied by said astable multivibrator.

30. A device as claimed in claim 1, wherein said output signal of said astable multivibrator is fed to an indicator element; said astable multivibrator being activated when said vehicle exceeds said minimum speed, this state therefore being indicated by intermittent operation of said indicator element.

31. A device as claimed in claim 1, wherein said alarm means are of optical and/or acoustic type.

* * * * *